United States Patent [19]

Moore et al.

[11] Patent Number: 5,078,171
[45] Date of Patent: Jan. 7, 1992

[54] METHOD AND APPARATUS FOR SELECTIVELY ENCLOSING A LENGTH OF PIPE

[75] Inventors: Douglas R. Moore, Riverside; Charles D. Moore, Glendora, both of Calif.

[73] Assignee: Ted Sales, Inc., Ontario, Calif.

[21] Appl. No.: 486,957

[22] Filed: Mar. 1, 1990

[51] Int. Cl.⁵ .............................................. F16L 55/18
[52] U.S. Cl. ...................................... 137/15; 137/382; 220/3.4; 220/484
[58] Field of Search ................. 137/377, 382, 15; 220/3.4, 484

[56] References Cited

U.S. PATENT DOCUMENTS

| | | | |
|---|---|---|---|
| 1,108,840 | 8/1914 | Franke | 137/382 |
| 1,326,768 | 12/1919 | Morgan | 137/382 |
| 1,400,615 | 12/1921 | McCalmont | 70/176 |
| 1,541,801 | 6/1925 | Durning | 137/382 |
| 1,565,066 | 12/1925 | Dourson | 248/75 |
| 1,920,128 | 7/1933 | Mickler | 70/178 |
| 2,236,477 | 3/1941 | Fuchs | 251/119 |
| 2,357,777 | 9/1944 | White | 62/1 |
| 3,724,491 | 4/1973 | Knudsen et al. | 137/375 |
| 3,980,099 | 9/1976 | Youngblood | 137/382 |
| 4,021,131 | 5/1977 | Bakken et al. | 220/484 |
| 4,207,918 | 6/1980 | Burns et al. | 137/375 |
| 4,208,893 | 6/1980 | Avrich et al. | 70/178 |
| 4,259,981 | 4/1981 | Busse | 137/375 |
| 4,352,370 | 10/1982 | Childress | 137/382 |
| 4,513,773 | 4/1985 | Hardiman, Jr. | 137/382 |
| 4,558,206 | 12/1985 | Ball | 137/341 |
| 4,726,394 | 2/1988 | Devine | 137/375 |

Primary Examiner—A. Michael Chambers
Attorney, Agent, or Firm—Knobbe, Martens, Olson & Bear

[57] ABSTRACT

An enclosure for selectively cooperating with embedded securing bars prevents unauthorized access to above ground portions or underground piping networks. The enclosure employs a pivot channel and a retainer channel separated by a distance substantially equal to the distance separating the securing bars. The pivot channel and the retainer channel are configured so as to require rotational and horizontal motion of the enclosure so as to operatively disposed the enclosure relative to the securing bars. The locking member of the enclosure is used to secure a securing bar within the retainer channel so as to prevent rotation of the enclosure relative to either securing bar.

11 Claims, 9 Drawing Sheets

METHOD AND APPARATUS FOR SELECTIVELY ENCLOSING A LENGTH OF PIPE

BACKGROUND OF THE INVENTION

This invention relates to the protection of pipes and, more particularly, to an enclosure for providing selective access to aboveground checkpoints of an underground piping system.

Underground or buried piping systems are used in a variety of applications, including agricultural irrigation, fuel transportation and communication systems. Underground piping provides an unobtrusive means for deploying a network of pipes over large areas. The underground piping also minimizes unauthorized access to the network, thereby reducing incidents of vandalism or interruption of services. However, the underground networks employ intermediate checkpoints, such as shut-off valves, meters or back-flow valves. Proper functioning of the checkpoints is necessary to ensure proper functioning of the network. As the checkpoints often require periodic maintenance or readings, there is a need for the checkpoints to be readily accessible. Therefore, the checkpoints are typically disposed aboveground. However, as the checkpoints extend above the ground, they are subject to unauthorized interference, which may interrupt the performance of the network.

In an effort to protect the checkpoints, prior attempts have included the use of locks to secure an exposed valve in the desired position. However, even though the valve may be secured in the desired position, the valve itself is exposed to tampering. Alternatively, the prior art has locked the checkpoints within a separate housing. Typically, the housing is a site specific box permanently affixed to a structure or a base. The box includes a lid which may be closed to protect the checkpoint. The lid is secured by padlocks or, alternatively, irregular shaped bolts or fasteners. However, the use of unique tools to expose the checkpoint requires that the tool be carried on site to each checkpoint. Therefore, damage or loss of the tool precludes access to the checkpoint. In addition, the attachment of permanent, site-specific boxes to a separate structure for each checkpoint is extremely time-consuming and expensive.

Therefore, a need exists for an enclosure which may selectively enclose a checkpoint so as to prevent unauthorized access to the checkpoint. In addition, the need exists for a enclosure which may cooperate with a standard base. The need also exists for an enclosure which may be used to enclose a variety of checkpoint configurations without requiring modification of the enclosure or the base.

SUMMARY OF THE INVENTION

An enclosure for permitting selective access to a piping system checkpoint is disclosed. Preferably, the enclosure cooperates with a standard configuration base or pad. The enclosure does not require the use of special tools to disengage the enclosure from the pad. In addition, the enclosure may cooperate with a standard padlock or combination lock to provide only authorized access to the checkpoint.

In the preferred embodiment, the enclosure cooperates with a pad having a pair of parallel securing bars embedded in a concrete foundation such that the securing bars are separated by a predetermined distance and the checkpoint is disposed between the securing bars. Preferably, securing bars are substantially U-shaped, having a horizontal length substantially parallel to a surface of the pad.

Preferably, the enclosure defines 5 of the 6 sides of a rectangular volume. The enclosure includes a locking member, a handle recess, a pivot channel and a retainer, wherein the pivot channel and the retainer channel are separated by the predetermined distance.

To engage the enclosure with the securing bars, the pivot channel receives a portion of the horizontal length of the first securing bar. The enclosure is then rotated about the first securing bar until the second securing bar is proximate to the retainer channel. The enclosure is then disposed horizontally relative to the securing bars so as to dispose the first and second securing bars within the pivot channel and retainer channel, respectively. The locking member is then disposed so as to retain the second securing bar within the retainer channel, thereby precluding rotation of the enclosure about the first securing bar. As the pivot channel is separated from the retainer channel by the predetermined distance, the first securing bar is effectively retained within the pivot channel so as to preclude rotation of the enclosure about the second securing bar.

DETAILED DESCRIPTION OF THE PREFERRED EMBODIMENT

Figure 1:
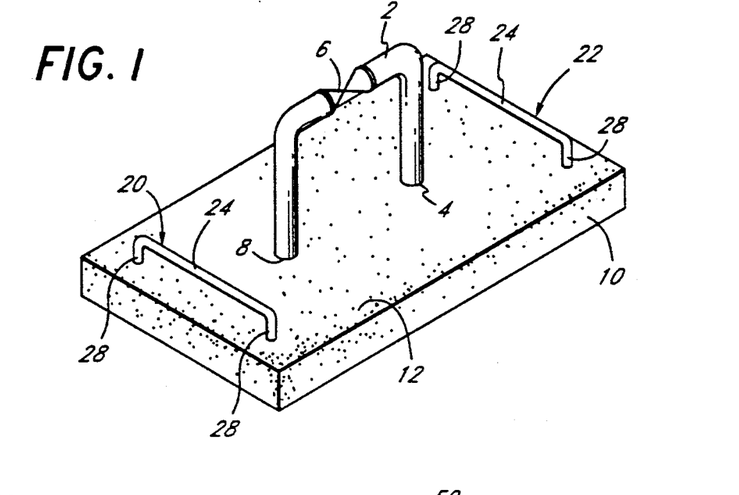
FIG. 1 is a perspective view of a length of piping extending above the ground.

The present invention includes an apparatus and method for providing selective access to an exposed portion of underground piping, conduit or cable. As used herein, the terms "pipe" or "piping" may include underground networks including conduits, pipes and communication lines. Preferably, as shown in FIG. 1, the exposed portion of pipe extends above the ground in a substantially U-shaped configuration such that the checkpoint is disposed along the length of the exposed pipe. The term "checkpoint" includes the section of the exposed pipe to be protected, such as a flow control device or meter.

Figure 2:
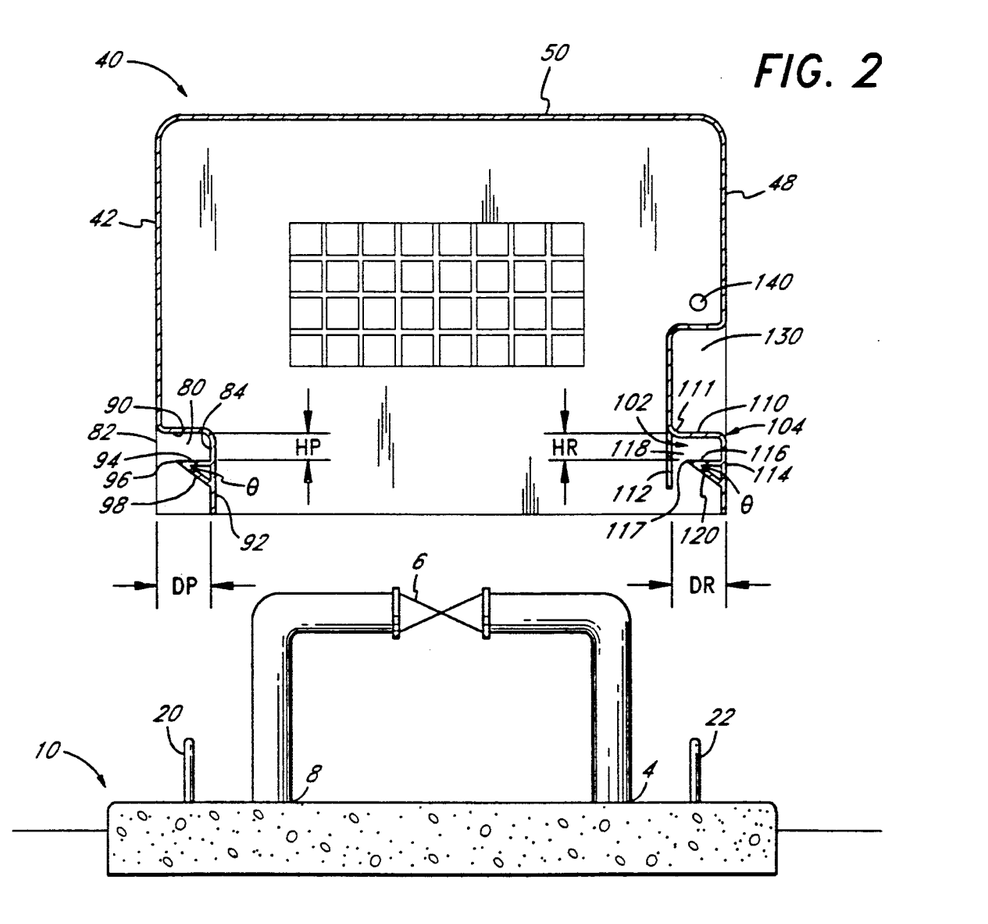
FIG. 2 is a cross section showing the enclosure relative to the exposed pipe.

Referring to FIGS. 1 and 2, the system of the present invention includes a pad 10, a first and a second parallel securing bars 20, 22 and an enclosure 40 having a pivot channel 80, a retainer channel 100 and a locking member 140. As shown in FIG. 1, a pipe 2 has an inlet 4 and an outlet 8 as it extends above the ground. A checkpoint 6 is disposed intermediate of the inlet 4 and outlet 8. Preferably, the inlet 4 and outlet 8 extend through the pad 10 as the pipe 2 exits and re-enters the ground. The pad 10 forms a foundation substantially surrounding the inlet 4 and outlet 8 at the interface with the ground. Although the pad 10 may be formed of concrete, metal or wood, the pad is preferably formed of concrete. The pad 10 is securely embedded in the earth so that it is permanently affixed relative to the ground, the inlet 4, the checkpoint 6 and the outlet 8. The pad 10 surrounds the inlet 4 and outlet 8 to form a substantially rectangular block having a substantially planar face 12 such that the checkpoint 6 is disposed above the planar face 12.

As shown in FIGS. 1 and 2, the securing bars 20, 22 are embedded in the planar face 12 of the pad 10. The securing bars 20, 22 are separated by a predetermined distance, such that the inlet 4 and outlet 8 of the pipe 2 are disposed intermediate of the securing bars 20, 22. Alternatively, if only the checkpoint 6 is to be enclosed, the securing bars 20, 22 are disposed on opposing sides of the checkpoint 6.

Preferably, the securing bars 20, 22 are substantially identical in size, and form a substantially U-shaped configuration extending above the pad 10. Each securing bar 20, 22 includes a horizontal portion 24 extending parallel to the planar face 12 of the pad 10, and a leg 28 extending from each end of the horizontal portion 24 into the pad 10. Although the actual size depends on various design considerations, such as climate and operating environment, the legs 28 dispose the horizontal portions 24 of the securing bars 20 approximately 1.5 to 3.5 inches above the planar face 12. The horizontal portions 24 have a length of approximately 18 inches. The securing bars 20, 22 are formed of stainless steel and have a diameter of approximately ⅜ inch. Although the securing bars 20, 22 are shown having a substantially cylindrical cross section, the bars 20 may be any of a variety of cross sections, such as rectangular, square, hexagonal or octagonal. While the present invention is described in conjunction with U-shaped securing bars 20, 22, the invention may be employed with horizontal bars (not shown) which extend between opposing structures such that the checkpoint 6 is intermediate of the bars.

Figures 3, 3A, 4:
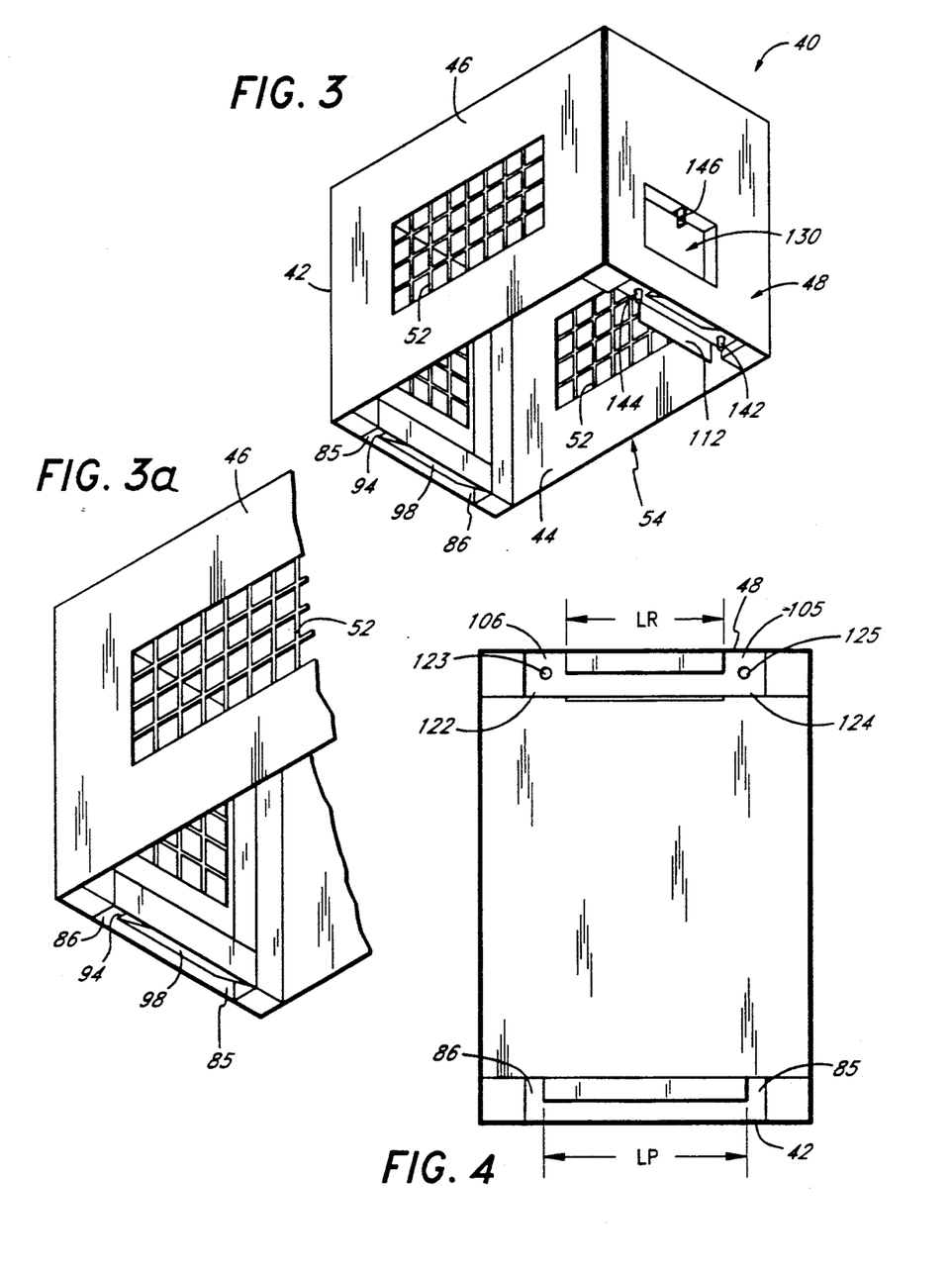
FIG. 3 is a perspective of the pivot channel and retainer channel of the enclosure.
FIG. 3a is a partial perspective of the pivot channel.
FIG. 4 is a bottom plan view of the enclosure.

Referring to FIG. 3, the enclosure 40 of the present invention is shown. The enclosure 40 cooperates with the securing bars 20 embedded in the pad 10 to provide selective access to the checkpoint 6. The enclosure 40 is a rigid, substantially rectangular box sized to enclose the checkpoint. Preferably, the enclosure defines five of the six sides of a rectangular volume. The sixth side of the volume is furnished by the pad 10 as the enclosure 40 cooperatively engages the securing bars 20.

The enclosure 40 includes a pivot end 42 and a retainer end 48, such that the retainer end 48 is parallel to and spaced from the pivot end 42. The pivot end 42 and the retainer end 48 are separated by side walls 44, 46 extending perpendicular to the pivot end 42 and the retainer end 48. The side walls 44, 46 are parallel to each other as they extend beyond the pivot end 42 and the retainer end 48. As shown in FIG. 3, the ends 42, 48 and the sides 44, 46 may be vented either by louvers (not shown) or a grid pattern of apertures 52. A top 50 is securely affixed to the ends 42, 48 and the sides 44, 46 so as to form the enclosure 40. Although the enclosure is shown vented for permitting visual inspection without unlocking the enclosure, the enclosure may alternatively be insulated to provide thermal protection for the interior of the enclosure.

The bottom of the pivot end 42, the retainer end 48 and side walls 44, 46 lie in a common plane which defines a base 54 of the enclosure 40. The base 54 is slightly smaller than the periphery of the pad 10.

Referring to FIGS. 2 and 3, the pivot end 42 includes a pivot channel 80 proximal to the base 54. The pivot channel 80 includes an open end 82 and a closed end 84 such that the open end 82 opens away from the volume defined by the enclosure 40. The pivot channel 80 is defined by a length LP, a height HP and a depth DP. The length LP of the pivot channel 80 is less than the length of the horizontal portion 24 of the first securing bar 20. Preferably, the length of the securing retainer by the pivot channel is sufficient to preclude torsion of the enclosure relative to the securing bar. The depth DP of the pivot channel 80 is the distance between the open end 82 and the closed end 84. As shown in FIGS. 3, 3a and 4, the length LP of the pivot channel 80 is bounded by a passageway 85, 86. The passageways 85, 86 are substantially coplanar with the closed end 82 and extend to the base 54 of the pivot end 42.

The pivot channel 80 includes a support wall 90, a stop wall 94 and an end wall 92. The end wall 92 connects the support wall 90 and the stop wall 94 to form the closed end 84 of the channel 80 and define the height HP of the channel 80. That is, the end wall 92 defines the distance between the support wall 90 and the stop wall 94. The height HP of the channel 80 is sufficient to slidably receive the diameter of the securing bar 20. Although the end wall 92 is shown substantially perpendicular to the support wall 90 and the stop wall 94, the end wall 92 may be arcuate so that the closed end 84 has a substantially rounded cross section. As shown in FIG. 3, the end wall 92 is substantially parallel with and coplanar to the passageway 85, 86 which bounds the length LP of the pivot channel 80.

As shown in FIGS. 2 and 7-10, the support wall 90 extends from the end wall 92 to terminate at the plane of the pivot end 42 of the enclosure 40. The stop wall 94 extends from the end wall 92 parallel to the support wall 90 and terminates at a distal end 96. Although the support wall 90 is shown extending a further distance from the end wall 92 than the stop wall 94, the stop wall 94 and the support wall 90 may extend substantially the same distance. The depth DP of the pivot channel 80 is defined by the common parallel length of the support wall 90 and stop wall 94. That is, the depth DP is defined by the distance from the open end 82 to the closed end 84.

The distal end 96 of the stop wall 94 is joined to a ramp 98. The ramp 98 extends from the distal end 96 to terminate in the plane of the end wall 92. The ramp 98 defines an angle $\theta$ with the stop wall 94 between 30° and 60°, with the preferred angle being approximately 45°.

Referring to FIGS. 2, 3, 4, 5 and 6, the retainer end 48 of the enclosure 40 includes a handle recess 130, the locking member 140 and a retainer channel 100. The retainer channel 100 is disposed proximal to the base 54. The handle recess 130 is located above the retainer channel 100. As discussed infra, the locking member 140 cooperates with the handle recess 130 and retainer channel 100 such that the locking member 140 may be selectively disposed proximal to the retainer channel 100.

Referring to FIGS. 2 and 7-10, the retainer channel 100 has an open end 102 and a closed end 104 such that the open end 102 opens in the same direction that the open end 82 of the pivot channel 80 opens. The retainer channel 100 is defined by a length LR, a height HR and a depth DR. The depth DR of the retainer channel 100 is the distance between the open end 102 and the closed end 104 of the channel. The length LR of the retainer channel 100 is less than the length of the horizontal portion 24 of the securing bar 20. Preferably, the length of the securing bar which may be disposed within the retainer channel 100 is equal to at least half the width of the retainer end. The length LR of the retainer channel 100 is bounded by a passageway 105, 106. The passageways 105, 106 are substantially coplanar with the closed end 104 of the retainer channel 100 and extend to the base 54 of the retainer end 48. The passageways 105, 106 permit the legs 28 of the securing bar 22 to extend proximal to the enclosure 40 without interfering with cooperation of the horizontal portion 24 and the retainer channel 100.

The retainer channel 100 includes a support plate 110, a stop plate 116 and an end plate 114. The end plate 114 connects the support plate 110 and the stop plate 116 to form the closed end 104 of the channel 100. As the end plate 114 defines the distance between the support plate 110 and the stop plate 116. That is, the end plate 114 defines the height HR of the retainer channel 100. The height defined by the end plate 114 is sufficient to permit the diameter of the horizontal portion of the securing bar 22 to be slidably received within the channel 100. Although the end plate 114 is shown to be substantially perpendicular to the support plate 110 and the stop plate 116, the end plate 114 may be an arcuate member, so that the closed end 104 of the retainer channel 100 has a substantially rounded cross section.

The support plate 110 and the stop plate 116 extend from the end plate 114 to form the retainer channel 100, such that the retainer channel 100 opens in the same direction as the pivot channel 80. The support plate 110 and the stop plate 116 extend parallel to each other, thereby defining the depth DR of the retainer channel 100. The support plate 110 extends substantially perpendicular from the end plate 114 to terminate at a distal end 111. The stop plate 116 extends from the end plate 114, parallel to the support plate 110, to terminate at a distal end 117. The support plate 110 extends a further distance from the end plate 114 than the stop plate 116. The length of the support plate 110 is greater than the length of the stop plate 116 by a distance which is at least equal to the diameter of the horizontal portion of the securing bar 22. As the support plate 110 and stop plate 116 extend substantially parallel from the end plate 114, the depth DR of the retainer channel 100 is defined by the common parallel length of the support plate 110 and the stop plate 116.

Proximate to the distal end 111 of the support plate 110, a guide plate 112 extends substantially perpendicular from the support plate 110; that is, parallel to the end plate 114. The guide plate 112 extends across the height HR of the channel 100 to terminate beyond the distal end 117 of the stop plate 116. The guide plate 112 and the distal end 117 of the stop plate 116 thereby define a throat 118. As the support plate 110 has a length greater than the stop plate 116, the throat 118 is sized to slidably receive the diameter of the securing bar 20 between the guide plate 112 and the distal end 117 of the stop plate 116.

The retainer channel 100 includes a ramp 120 affixed to the distal end 117 of the stop plate 116. The ramp 120 is disposed between the base 54 of the retainer end 48 and the stop plate 116. The ramp 120 extends from the distal end 117 of the stop plate 116 to terminate substantially coplanar with the end plate 114. The ramp 120 may form an angle Φ from 30° to 60° with the stop plate 116, wherein the preferred angle is approximately 45°.

Figure 5:
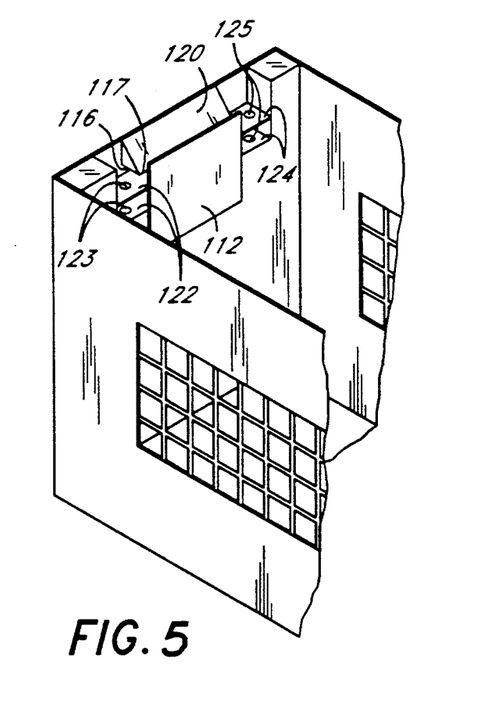
FIG. 5 is a partial perspective view of the retainer channel.
Figure 6:
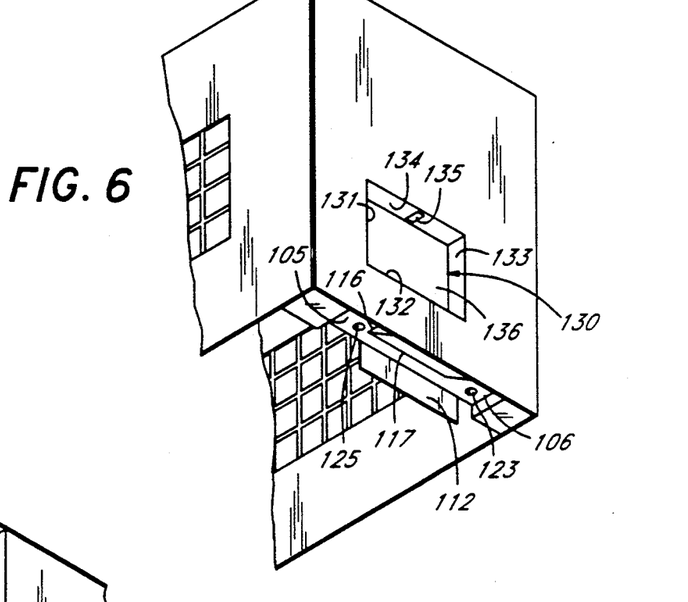
FIG. 6 is a partial perspective view of the retainer channel.

The retainer end 48 of the enclosure 40 also includes two pairs of inwardly extending flanges 122, 124 above the passageways 105, 106. As shown in FIGS. 5 and 6, each pair of flanges 122, 124 includes a colinear aperture 123, 125 therethrough, respectively. The apertures 123, 125 are sized to slidably receive the locking member 140. The apertures 123, 125 are spaced from the plane of the end wall 114 a distance which is substantially equal to or less than the length of the stop plate 116. In addition, the distance between the apertures 123, 125 and the plane of the end plate 114, the closed end 104 of retainer channel 100, is substantially equal to or less than the depth DP of the pivot channel 80.

Referring to FIGS. 2 and 7-10, the end plate 114 and the end wall 92 are separated by a distance substantially equal to the predetermined distance separating the securing bars 20. Preferably, the retainer channel 100 and the pivot channel 80 are equidistant from the top 50 of the enclosure 40.

As shown in FIG. 6, the handle recess 130 is formed in the retainer end 48 of the enclosure 40, above the retainer channel 100. The handle recess 130 provides for grasping of the enclosure 40 during engagement and disengagement with the securing bars 20. The handle recess 130 extends across the retainer end 48 a distance substantially equal to the length LR of the retainer channel 100. The handle recess 130 is a substantially rectangular recess defined by two pairs of parallel opposing walls 131, 133 and 132, 134. The four walls 131, 132, 133, 134 extend into the enclosure and are joined to a panel 136 so as to define the handle recess 130. The wall 134 defining the top of the recess includes an aperture 135 therethrough. The aperture 135 in the top wall 134 thereby exposes the interior of the enclosure 40 to the handle recess 130.

Figure 6A:
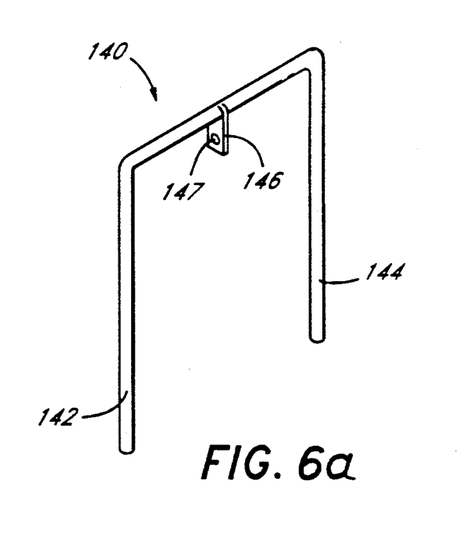
FIG. 6a is a perspective view of the locking member.
Figure 7:
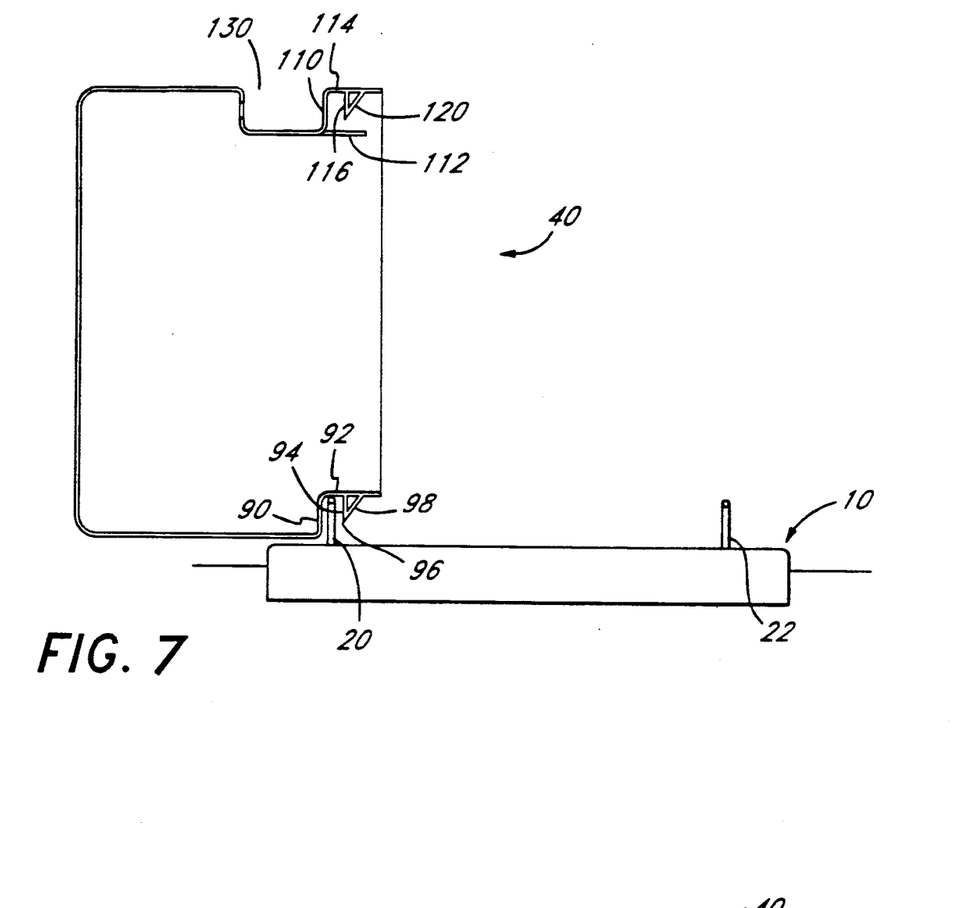
FIGS. 7-10 are schematic views showing steps in the engagement of the enclosure and the pad.

As shown in FIG. 6a, the locking member 140 is substantially "U" shaped, having opposing legs 142, 144 separated by a distance greater than the length LR of the retainer channel 100 and the width of the handle recess 130. The distance between the legs 142, 144 is substantially equal to the distance between the apertures 123, 125 of the flange pairs 122, 124. The closed end of the locking member 140 includes a lock tab 146 which extends from the center of the closed end, towards the open end. The lock tab 146 is sized to be slidably received through the aperture 135 of the top wall 134 of the recess 130. The lock tab 146 includes an aperture 147 therethrough which is sized to receive the shank of a standard combination or padlock.

The locking member 140 is operably engaged with the enclosure 40 by disposing the legs 142, 144 into apertures 123, 125 of the flange pairs 122, 124. As the legs 140, 142 slide through the apertures 123, 125, the lock tab 146 passes through the aperture 135 in the top wall 134 of the handle recess 130 so as to be disposed within the handle recess 130. Therefore, the only portion of the locking member 140 outside the volume defined by the enclosure 40 is the lock tab 146. The legs 142, 144 are inaccessible from outside the enclosure.

As the lock tab 146 is disposed within the handle recess 130, the legs 142, 144 of the locking member 140 are disposed across the height HR of the retainer channel 100. Therefore, the aperture 147 of the lock tab 148 is disposed within the handle recess 130 when the locking member 140 is disposed across the height HR of the retainer channel 100. When the lock tab 146 is pushed upward in the handle recess 130, the legs 142, 144 are disposed above the height HR of the retainer channel 100.

Operation of the Enclosure

Figure 8:
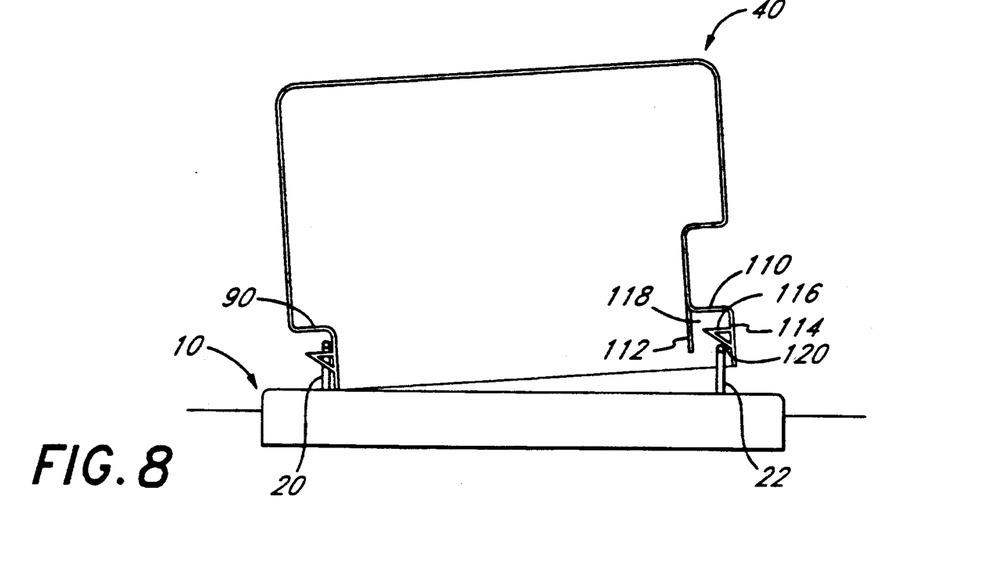
Figure 9:
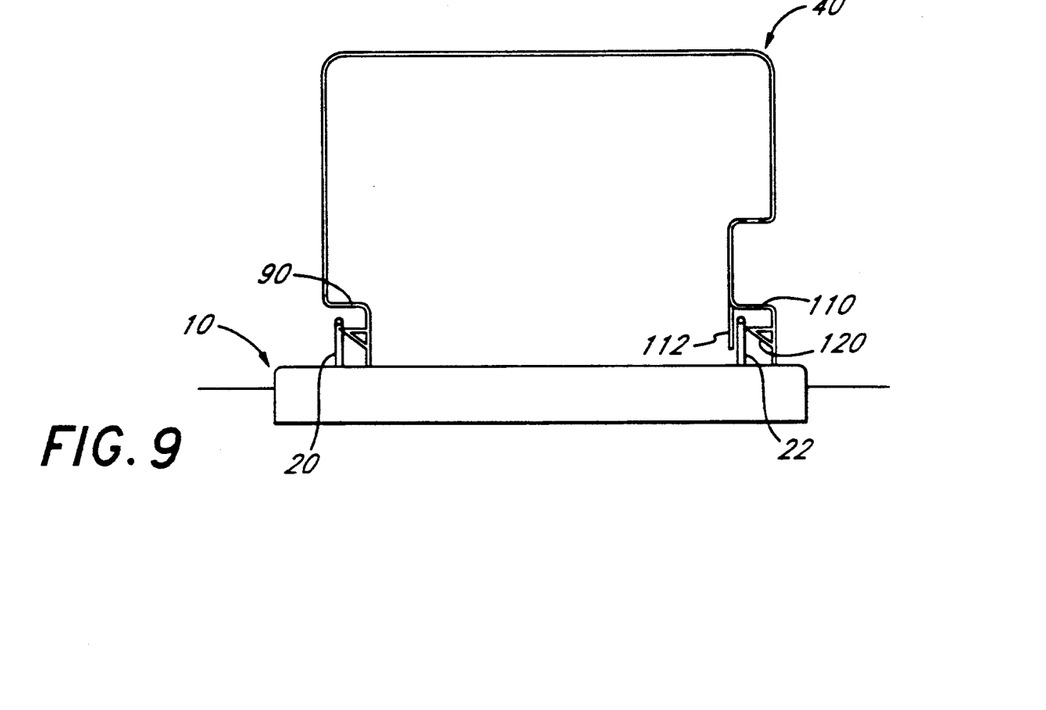

Referring to FIGS. 7-10, to operably engage the enclosure 40 with the securing bars 20, 22 so as to the selectively enclose the checkpoint 6, the first securing bar 20 is disposed within the pivot channel 80. As the first securing bar 20 is disposed within the pivot channel 80, the horizontal portion 24 contacts the end wall 92. As shown in FIG. 8, the enclosure 40 is rotated about the first securing bar 20 so that the horizontal portion 24 of the second securing bar 22 contacts the ramp 120. In this orientation of the enclosure 40, the vertical portions 24 of the first securing bar 20 extend in the corresponding passageways 85, 86.

Figure 10:
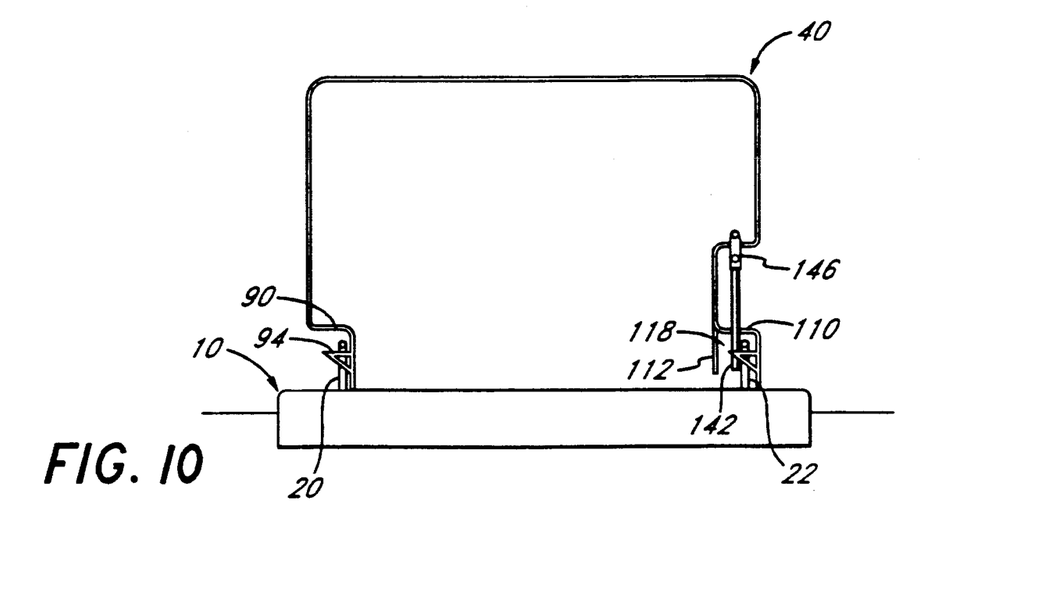

Referring to FIG. 8, as the ramp 120 contacts the horizontal portion 24 of the second securing bar 22; further rotation 40 of the enclosure causes the horizontal portion 24 of the first securing bar 20 to be displaced from the end wall 92 of the pivot channel 80 and contact the support wall 90. That is, the support wall 90 slides horizontally on the horizontal portion 24 of the first securing bar 20. The rotation causes the horizontal portion 24 of the second securing bar 22 to slide along the ramp 120 until the horizontal portion 24 reaches the distal end 117 of the stop plate 116; the second securing bar 22 then passes through the throat 118 between the guide plate 112 and the stop plate 116. On passing through the throat 118, the second securing bar 22 contacts the support plate 116, while the horizontal portion 24 of the first securing bar 20 remains in contact with the support wall 90. The entire enclosure 40 is then slid horizontally relative to the securing bars 20, 22 so that the horizontal portion 24 of the first and second securing bars 20, 22 are disposed proximal to the closed ends of the pivot and retainer channels 84, 104, respectively, as shown in FIG. 10.

The lock tab 146 is then permitted to enter the handle recess 130 and the locking member 140 is disposed downward through the apertures 123, 125 in the flanges 122, 124. The legs 142, 144 of the locking member 140 thereby extend across the height HR of the retainer channel 100. As the depth DR of the retainer channel 100 is greater than the distance from the plane of the end plate 114, the closed end 104 of the retainer channel 100, to the locking member 140, the second securing bar 22 may not pass through the throat 118. The second securing bar 22 is thereby retained within the retainer channel 100, and rotation of the enclosure 40 about the first securing bar 20 is precluded.

As the locking member 140 retains the second securing bar 22 within the retainer channel 100; the depth DP of the pivot channel 80 is greater than the depth of the retainer channel 100 between the locking member 140 and the end plate 114. That is, the depth DP of the pivot channel 80 is greater than the distance between the locking member 140 and the plane of the end plate 114. Therefore, as the second securing bar 22 is retained within the retainer channel 100, the horizontal portion 24 of the first securing bar 20 may not be removed from the pivot channel 80, and rotation of the enclosure 40 about the second securing bar 22 is precluded.

As the lock tab 146 is disposed within the handle recess 130, a standard padlock or combination lock (not shown) is placed through the aperture 147 in the lock tab 146. The lock tab 146 is thereby precluded from being raised, thereby ensuring that the legs 142, 144 of the locking member 140 remain across the height HR of the retainer channel 100 and the second securing bar 22 remains within the retainer channel 100.

As the securing bars only extend approximately 1.5 to 3.5 inches above the planar face 12 of the pad 10, and the pivot and retainer channels 80, 100 are proximal to the base 54 of the enclosure 40, a distance of only approximately 2 inches separate the base 54 from the pad 10. Access to the checkpoint is thereby effectively precluded.

Upon removal of the lock, the lock tab 146 and locking member 140 are disposed upwardly and the legs 142, 144 are raised above the height HR of the retainer channel 100. As the enclosure 40 rests upon the support wall 90 and support plate 110, the enclosure is then slid along the securing bars 20, 22 so that the horizontal portion 24 of the second securing bar 22 contacts the guide plate 112. That is, the second securing bar 22 is above the throat 118 between the guide plate 112 and the distal end 117 of the stop plate 116. The enclosure 40 is then rotated about the first securing bar 20 as the second securing bar 22 passes through the throat 118. The enclosure 40 may then be fully rotated about the first securing bar 20, or removed entirely from the pad 10.

Referring to FIGS. 11-14, an alternative embodiment of the present invention is shown. In the description of the alternative embodiment, the components which correspond to previously described components are designated by accented reference numerals, such as 100' corresponds to 100, while the additional components are assigned unique reference numerals.

Figures 11, 12:
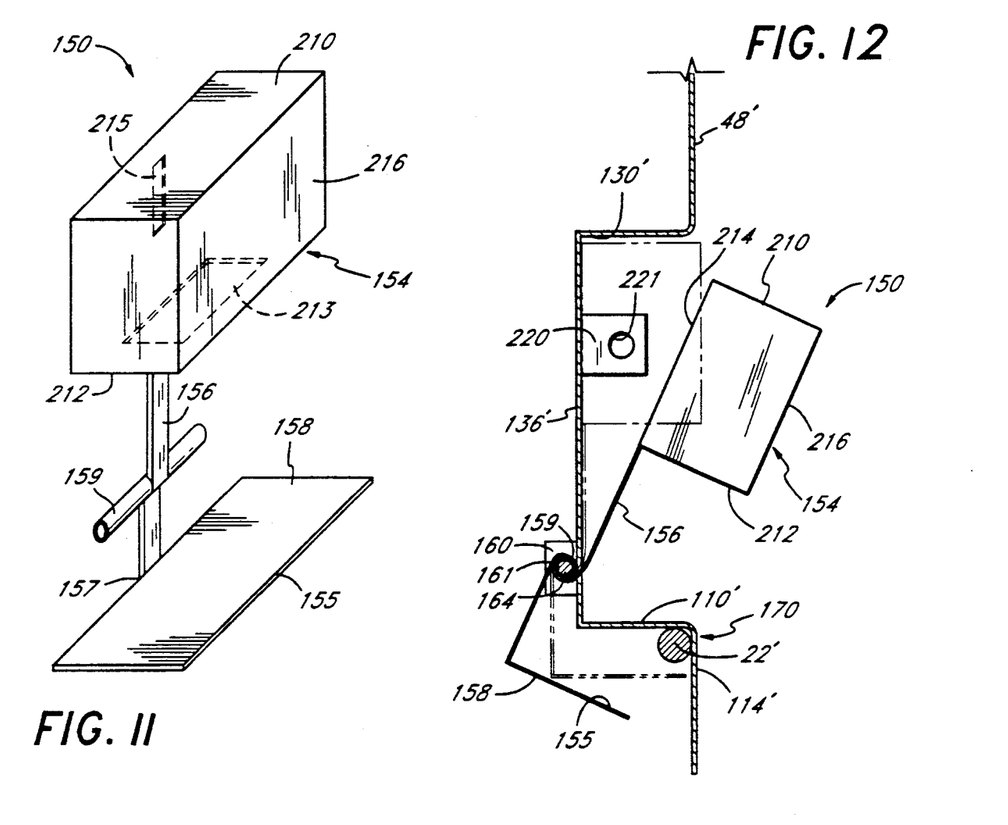
FIG. 11 is a perspective view of an alternative embodiment of a locking member.
FIG. 12 is a cross-sectional view of the retainer channel with the alternative locking member.

As shown in FIG. 12, the alternative embodiment may include a rocker bar 150 which is selectively disposed relative to a retainer shoulder so as to preclude separation of the securing bar 22' from between the retainer shoulder and the rocker bar. As shown in FIG. 11, the rocker bar 150 includes a handle 154 affixed to an elongate shank 156, wherein the shank terminates at a distal end 157. The distal end 157 includes a claw 158 extending substantially perpendicular to the shank 156. The shank 156 includes a transverse sleeve 159 intermediate of the handle 154 and the claw 158. As shown in FIGS. 11 and 12, the claw 158 extends perpendicular to the shank 156 to terminate at a distal end 155, such that when the rocker bar 150 is in the lock position, shown in phantom in FIG. 12, the distal end of the claw is proximal to the end wall 114'.

Figure 13:
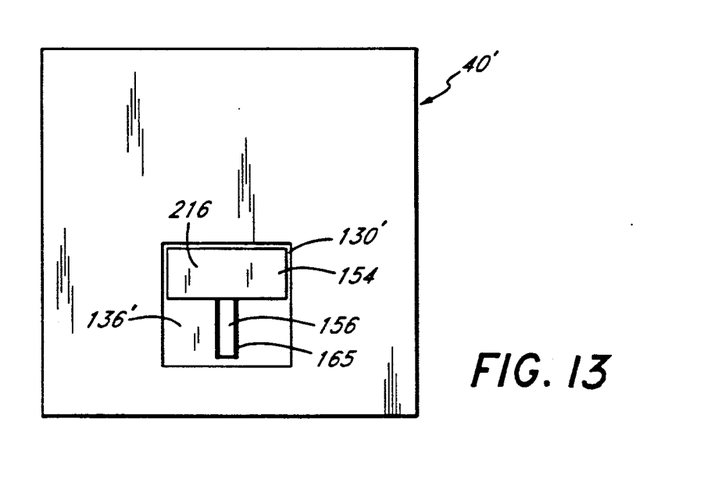
FIG. 13 is an end view of an enclosure, including the alternative locking member.

Referring to FIG. 11, the handle 154 forms an open ended rectangular volume defined by a top wall 210, a parallel bottom wall 212, a back wall 214 and a parallel front wall 216. As shown in FIGS. 12 and 13, in a lock position, the handle 154 extends across the width of the handle recess 130' such that the back wall 214 and the panel wall 136' define a common plane, and the front wall 216 and the plane of the retainer end 48' are substantially coplanar.

The top and front walls 210, 216 are solid and the back and bottom walls 214, 212 include apertures. The back wall 214 includes a tab aperture 215 proximal to the center of the wall. The bottom wall 212 includes a lock aperture 213 therethrough sized to receive a standard combination or padlock.

Figure 14:
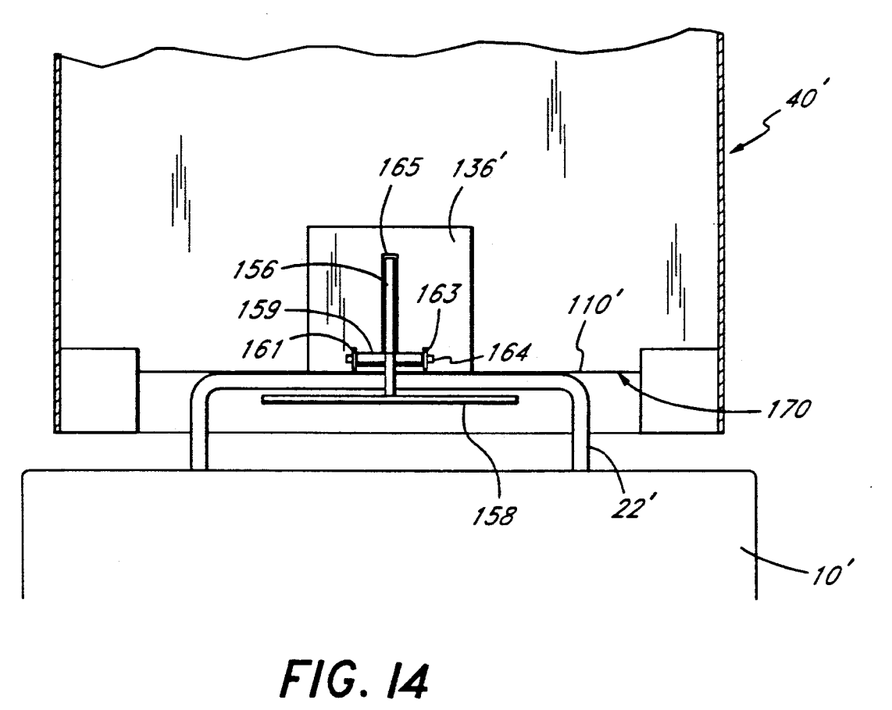
FIG. 14 is a partial end view from the interior of the enclosure showing the alternative locking member.

As shown in FIGS. 12-14, the retainer end 48, is modified to accommodate the rocker bar 150. Specifically, the panel 136' of the handle recess 130' includes an elongate aperture 165 extending vertically in the recess. The elongate aperture 165 is sized to receive the shank 156 of the rocker bar 150 therethrough. The panel 136' includes a tab 220 projecting substantially perpendicular from the panel above the top of the aperture 165. The tab 220 includes an aperture 221 sized to receive the shank of a standard combination or padlock (not shown). In addition, the inside of the panel 136', that is the side exposed to the interior of the enclosure 40', includes a fulcrum mount 160, 162 on each side of the elongate aperture 165. Each mount 160, 162 includes an aperture 161 therethrough such that the apertures are colinear. The rocker bar 150 is affixed to the enclosure 40' by a pin 164 passed through the apertures 161 and the sleeve 159 of the rocker bar. However, alternative means for providing the pivot of the rocker bar 150 may be employed, as well known in the art.

Referring to FIGS. 12 and 14, the guide plate and the stop plate are omitted. Therefore, the support plate 110' and the end plate 114' form the retainer shoulder 170. In the lock position, the retainer shoulder 170 cooperates with the rocker bar 158 to effectively trap the securing bar therebetween.

Referring to FIG. 12, when the handle 154 is pushed upward in the handle recess 130' towards the panel 136', the claw 158 rotates downward, to be disposed beneath the securing bar as the securing bar contacts the support plate 110' at the retainer shoulder 170. The claw 158 and the shank 156 thereby trap the securing bar between the retainer shoulder 170 and the rocker bar. The tab 220 simultaneously passes through the aperture 215 in the back wall 214 to be disposed within the handle 154. A lock is then passed through the aperture 213 in the bottom wall 212. The handle 154 is then locked in this position by a conventional combination or padlock. As the handle cannot be withdrawn from the recess 130', the claw 158 and shank 156 cooperate with the retainer shoulder 170 to trap the securing bar. When the handle 154 is unlocked, the handle is disposed downward in the handle recess 130', thereby causing the claw 158 to rotate upward, away from the retainer shoulder 170 so that the securing bar 22' may pass from the retainer shoulder 170.

Figure 15:
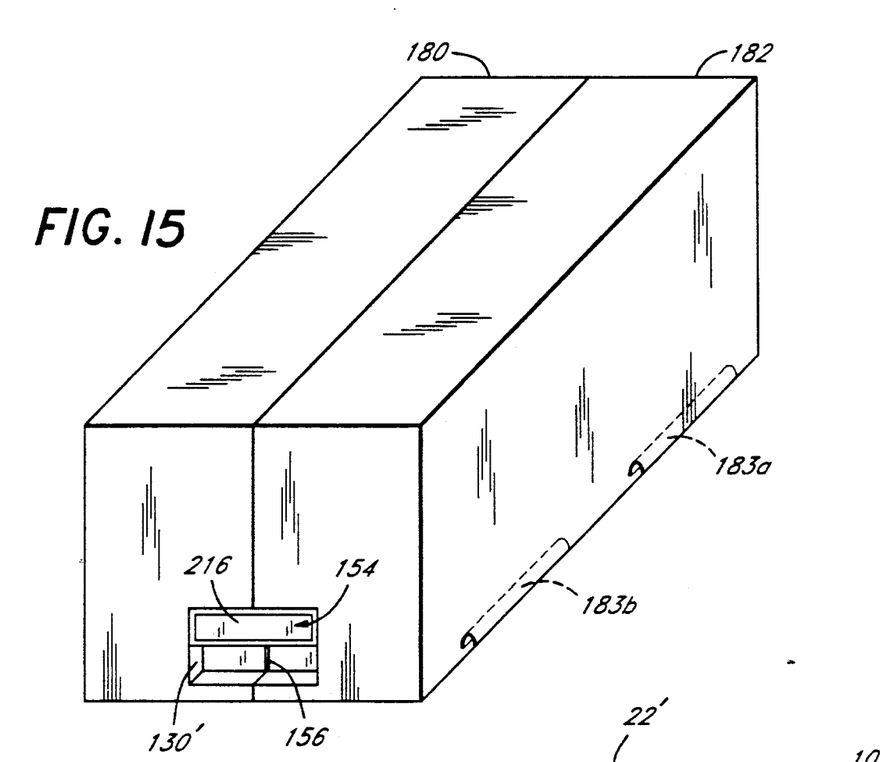
FIG. 15 is a perspective view of a segmented enclosure, including the alternative locking member.
Figure 17:
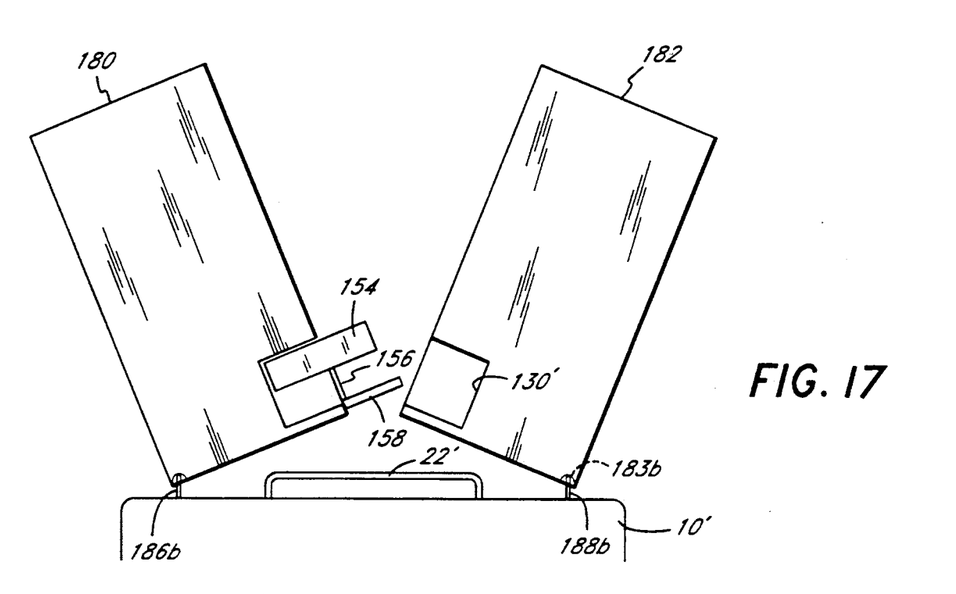
FIG. 17 is an end view of a segmented enclosure showing the segments in a partially open configuration.

When the checkpoint is relatively large or a plurality of proximal checkpoints are exposed, the enclosures are relatively large and may have a length of over 5 feet. As enclosures approach this size and larger, the enclosures become difficult to handle. Referring to FIGS. 15 and 17, the present invention is employed with a large enclosure. The enclosure is segmented through the longitudinal axis so as to form opposing lateral segments 180, 182. Each lateral segment 180, 182 employs the disclosed system to secure the segment relative to the securing bars 20', 22'.

Figure 16:
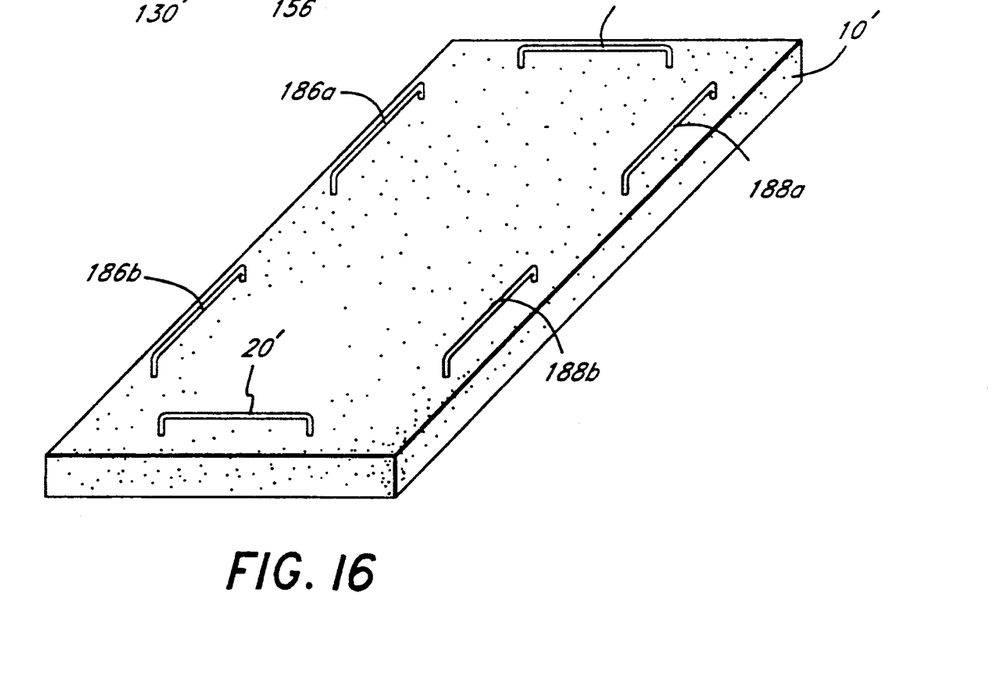
FIG. 16 is a perspective view of a pad for segmented enclosures.

The pad 10' includes the first and second securing bars 20', 22'. However, the pad is modified to include two pairs of lateral bars 186a,b, 188a,b. The lateral bars 186a,b, 188a,b support the length of the segments 180, 182 as they extend between the first and second securing bars 20', 22'. The lateral bars 186a,b, 188a,b are perpendicular to the securing bars 20', 22'. Preferably, the lateral bars are equidistant from the bars 20', 22' and are proximal to the periphery of the pad 10'. The lateral bars 186a,b, 188a,b are of the same construction as the first and second securing bars 20',22' and are similarly embedded in the pad 10'.

Referring to FIGS. 15 and 17, each segment 180, 182 includes a retainer shoulder 170 at each end. Segment 180 includes a rocker bar 150 at each end which cooperates with a recess 130' in segment 182 to secure both segments relative to the securing bars. In addition, the base 54' of the outer lateral edge of each segment 180, 182 includes a longitudinal arcuate channel 181a,b, 183a,b sized to receive the lateral bar 186a,b, 188a,b respectively therein. The lateral channels 181a,b, 183a,b extend substantially the length of the horizontal portion of the lateral bars 186a,b, 188a,b. The lateral channels 181, 183 open towards the planar surface 12' of the pad 10'.

In the operation of the segmented enclosure 180, 182, the lateral channels 181a,b, 183a,b are disposed on the corresponding lateral bars 186a,b, 188a,b. Referring to FIGS. 15 and 17, the segments 180, 182 are rotated about the lateral bars 186a,b, 188a,b so that the segments abut along the lateral axis of the pad 10'. The securing bars 20', 22' are thereby disposed at the retainer shoulder 170 at each end of the enclosure. The rocker bar 150 in each end of the segment 180 is then pushed upward to dispose the claw 158 proximal to the corresponding retainer shoulder 170. Passage of the securing bars 20', 22' from between the rocker bar 150 and the retainer shoulder 170 is thereby precluded.

Figure 18:
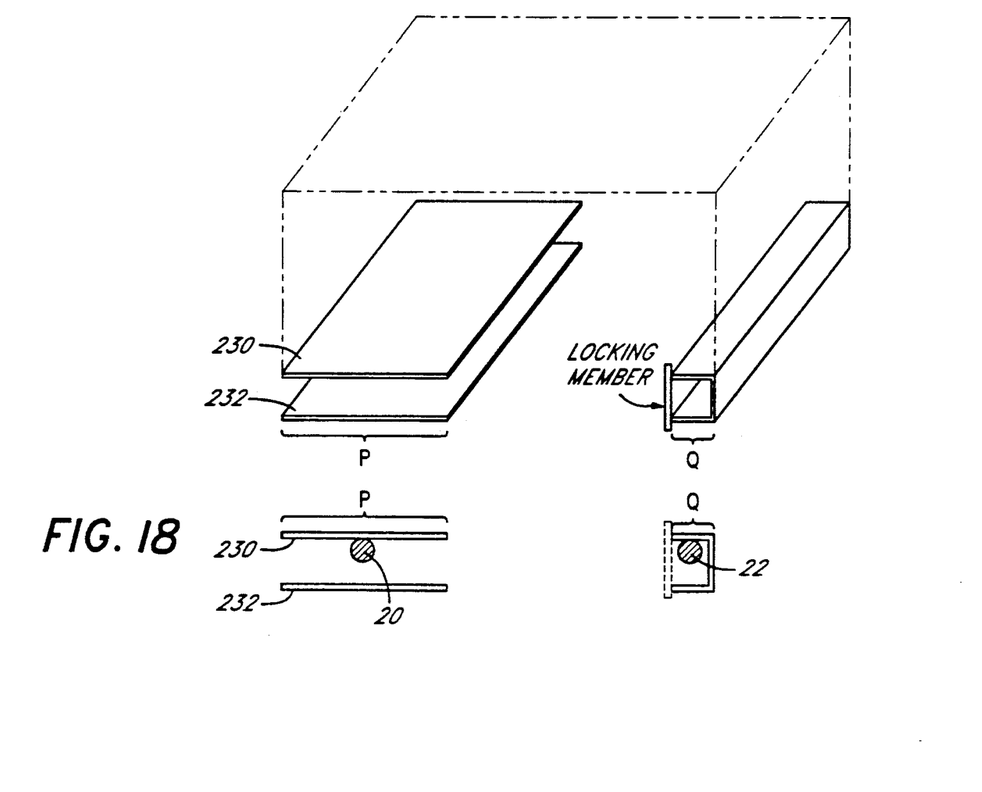
FIG. 18 is a schematic view of an alternative embodiment of the invention.

Although the pivot channel 80 is shown having a closed end 84, an alternative embodiment of the present invention may include a pair of parallel plates, in place of the pivot channel, as shown in FIG. 18. That is, the capturing member may be in the form of a pivot channel or parallel plates. The parallel plates 230, 232 are separated by a distance sufficient to receive the diameter of the securing bar therebetween. It is only necessary that the plates 230, 232 have a common parallel length P which is greater than the distance Q, the distance of the opposing securing bar may be moved relative to the enclosure in the locked, or trapped configuration.

Although the present invention has been described in terms of particular embodiments, it is not limited to these embodiments. Alternative embodiments and modifications which will be still be encompassed by the invention, may be made by those skilled in the art, particularly in light of the foregoing teachings. The invention may be employed to provide a secure container in remote locations such as construction sites. It is not necessary that a length of pipe be enclosed. Alternative embodiments, modifications or equivalents may be included within the spirit and scope of the invention as defined by the claims.

What is claimed is:

1. A method for selectively enclosing an exposed length of piping extending between a first and a second securing bar separated by a predetermined distance, comprising:

(a) engaging the first securing bar in a pivot channel of an enclosure;

(b) rotating the enclosure relative to the first securing bar so as to dispose the second securing bar proximal to a retainer channel;

(c) displacing the enclosure relative to the first and second securing bar so as to dispose the first securing bar in the pivot channel and the second securing bar in the retainer channel; and (d) retaining the second securing bar in the retainer channel so as to preclude rotation of the enclosure about the first and second securing bars.

2. A method for enclosing a length of piping extending between a first and a second securing bar, comprising:

(a) engaging the first securing bar in a pivot channel;

(b) disposing the enclosure relative to the first and second securing bars so that the first securing bar is within the pivot channel and the second securing bar is within a retainer channel so as to preclude rotation of the enclosure about the second securing bar; and (c) retaining the second securing bar within the retainer channel so as to preclude rotation of the enclosure about the first and second securing bars.

3. A system for selectively enclosing a length of piping extending from the ground, the piping having an inlet and an outlet comprising:

(a) a pad surrounding the inlet and the outlet;

(b) a first and a second securing bar rigidly affixed relative to the pad such that the inlet and the outlet are intermediate of the securing bars, the securing bars being substantially parallel and separated by a predetermined distance; and (c) an enclosure for selectively engaging the securing bars to enclose the length of piping, the enclosure including a pivot channel and a retainer channel each sized to receive a respective one of said securing bars therein, the pivot channel and retainer channel being fixed with respect to the enclosure and separated by the predetermined distance.

4. An apparatus for providing selective access to a length of pipe which extends between a first and a second securing bar, comprising:

an enclosure sized to enclose the pipe, the enclosure having:

(a) a pivot end, wherein the pivot end includes a pivot channel having an open end and a closed end which define a depth of the channel sufficient to receive the first securing bar therein;

(b) a retainer end, including a retainer channel, wherein the retainer channel is spaced from the pivot channel by the predetermined distance and includes an open end and a closed end which define a depth of a retainer channel sufficient to receive the second securing bar therein; and (c) a locking member for selectively precluding passage of the second securing bar from the open end of the retainer channel, wherein the depth of the pivot channel is at least as great as the depth of the retainer channel as defined by the locking member.

5. An enclosure for providing selective access to a length of piping by the selective engagement of the enclosure with a pair of parallel securing bars separated by a predetermined distance such that the length of piping to be enclosed is intermediate of the securing bars, the enclosure comprising:

(a) a pivot channel for receiving a securing bar including:

an end wall;

a support wall extending from the end wall; and an stop wall extending from the end wall substantially parallel to the support wall and spaced from the support wall a distance sufficient to receive a securing bar therebetween;

(b) a retainer channel for receiving a securing bar including:

an end plate extending substantially parallel to the end wall and spaced from the end wall by a distance at least as great as the predetermined distance;

a support plate extending from the end plate; and a stop plate extending from the end plate parallel to the support plate and spaced from the support plate a distance sufficient to receive a securing bar therebetween, the stop plate terminating at a distal end; and (c) a locking member for precluding passage of the securing bar from between the stop plate and the support plate, wherein the locking member selectively extends across the distance between the support plate and the stop plate so as to define a depth of the retainer channel;

wherein the length of the support wall and the stop wall is at least as great as the depth of the retainer channel as defined by the locking member.

6. The enclosure of claim 5, wherein the support plate extends from the end plate a distance greater than the distal end of the stop plate.

7. The enclosure of claim 6, further comprising:

a guide plate extending from the support plate proximal to the distal end of the stop plate so as to form a throat therebetween, the throat being sized to receive a securing bar therethrough.

8. An enclosure for providing selective access to a length of pipe by the selective engagement of the enclosure with a first and a second securing bar separated by a predetermined distance such that the length of pipe to be enclosed extends intermediate of the first and second securing bars, the enclosure comprising:

(a) a pivot channel having an open end and a closed end which define a depth of the channel therebetween, such that the depth of the channel is sufficient to receive the first securing bar therein;

(b) a retainer channel spaced from the pivot channel by a distance substantially equal to the predetermined distance, the retainer channel having an open end and a closed end which define a depth of the channel therebetween, such that the depth of the channel is sufficient to receive the second securing bar therein; and (c) a locking member for selectively precluding passage of the second securing bar from the open end of the retainer channel as the first securing bar is within the pivot channel, such that the locking member has a lock position and an unlock position, wherein the locking member in the lock position defines a distance from the closed end of the retainer channel to the locking member which is substantially equal to the depth of the retainer channel and the depth of the pivot channel, and the locking member in the unlock position permits passage of the second securing bar from the retainer channel.

9. The enclosure of claim 8, wherein the depth of the pivot channel is greater than the distance from the locking member in the lock position to the closed end of the retainer channel.

10. The enclosure of claim 8, wherein the locking member is a substantially U-shaped member having opposing legs which are disposed across the open end of the retainer channel when the locking member is in the lock position.

11. The enclosure of claim 8, wherein the locking member includes a rocker bar which pivots relative to the open end of the retainer channel so that a portion of the rocker bar precludes passage of the second securing bar from the open end of the retainer channel when the locking member is in the lock position.

* * * * *